United States Patent [19]

Wilde

[11] 4,264,635

[45] Apr. 28, 1981

[54] AUTOMATIC PASTA PERFORATOR AND METHOD OF MAKING PASTA

[76] Inventor: Stanley A. Wilde, Libertyville, Ill.

[21] Appl. No.: 26,899

[22] Filed: Apr. 4, 1979

[51] Int. Cl.³ .................................................. A23B 3/04
[52] U.S. Cl. ........................................ 426/451; 225/2; 264/146; 264/156; 426/517; 426/518; 426/557
[58] Field of Search ............... 426/557, 451, 516, 517, 426/518; 425/291, 290; 264/156, 146; 225/2

[56] References Cited

U.S. PATENT DOCUMENTS

| | | | |
|---|---|---|---|
| 1,355,731 | 10/1920 | Block | 426/557 |
| 1,747,954 | 2/1930 | Rydberg | 425/291 |
| 3,770,358 | 11/1973 | Steels et al. | 425/291 |
| 3,846,563 | 11/1974 | Cunningham | 426/557 |

OTHER PUBLICATIONS

Hummel, *Macaroni Products,* pp. 97–111, 125–139 and 192–195, published by Food Trade Press, Ltd, 1966.

*Primary Examiner*—Raymond N. Jones
*Assistant Examiner*—George C. Yeung
*Attorney, Agent, or Firm*—Hill, Van Santen, Steadman, Chiara & Simpson

[57] ABSTRACT

A method and device for assuring uniform lengths of cleanly end broken pasta from elongated relatively wide ribbons is disclosed which elevates folded over pasta paste ribbons between two opposed knife edge members which are moveable towards and away from one another. Movement of the knife edge members is timed relative to the elevational movement of the ribbon. The knife edges are serrated and, when moved towards one another, entrap the ribbon therebetween scoring the ribbon at uniform distances along the length of the ribbon. After drying the ribbons are broken to uniform lengths along the score lines.

4 Claims, 7 Drawing Figures

AUTOMATIC PASTA PERFORATOR AND METHOD OF MAKING PASTA

BACKGROUND OF THE INVENTION

1. Field of the Invention

This invention relates to pasta making and more particularly to methods and devices for cutting long pasta ribbons to uniform lengths.

2. Prior Art

Pasta is produced in a wide variety of shapes. A popular subgroup of shapes is referred to as long goods and consists of pasta paste extruded in a long ribbon. One particular style of long goods are relatively wide pasta such as lasagna.

A common method of manufacturing relatively wide elongated pasta long goods includes the extrusion of a paste ribbon through an elongated die, and thereafter draping the ribbon over a drying rod providing a double ribbon strip with one length of ribbon depending from each side of the drying stick. After trimming the double strips to length, the pasta is transported on the drying stick to a drying area. After prolonged drying at controlled temperature and humidity, the strips are then cut to the desired individual product length. Since the dried pasta is extremely hard while at the same time being brittle, difficulty has been encountered in cutting the strips to uniform lengths for subsequent packaging. It has been known to use saws, both of the circular and band type, as well as other cutting tools. It has been found that due to the abrasive nature of the dried pasta that saws are subjected to extreme wear and early dulling. Additionally, saws have been found to provide somewhat ragged edges in the area of the cut since the brittleness of the pasta tends to cause fragmentation of the area adjacent the saw kerf.

It would therefore be an advance in the art to provide an improved method of forming uniform lengths of wide pasta which did not require the use of cutting tools on the dried strip.

SUMMARY OF THE INVENTION

It is therefore a general object of this invention to provide an improved method and device for enabling relatively wide pasta long goods to be separated to substantially uniform lengths.

This object is achieved by a method which scores and/or perforates the individual long pasta strips at spaced intervals along the length of the strip. The scoring and/or perforating is done while the strip is still wet. The scoring and/or perforating is controlled in a manner which allows the strip to retain sufficient longitudinal integrity such that the individual lengths between the scoring or perforations will not become separated during routine handling and drying of the strips. However, the scoring and/or perforations are such that a localized weak point is provided along from the dried strip due to the brittle nature of the strip. Thus the method of this invention relies upon three attributes of the pasta. These are (1) the relative deformability of the pasta when wet; (2) the strength of a pasta ribbon in tension even when wet and; (3) the brittleness of pasta when dry.

The method of insuring even separation of uniform lengths of extruded pasta long goods according to this invention comprises the steps of extruding a pasta paste ribbon having a relatively high moisture content, draping the ribbon over a drying stick forming pasta strips depending from opposed portions of the stick, moving the strips vertically between opposed relatively moveable knife members, actuating the knife members to move them towards one another to entrap the strips therebetween, perforating transversely spaced portions of the strips by spaced projections along the knife edge while maintaining the longitudinal integrity of the strips sufficiently high so that the strips will not separate at the perforations during subsequent handling and drying, withdrawing the knives from contact with the strips, drying the strips, and breaking the dried strips into substantially uniform lengths along the perforation lines. In a preferred embodiment, the knives are pivotably mounted so as to be arcuately moveable from a time of initial contact with the moving strips to a time of withdrawal from contact with the strips. Further, in the preferred embodiment, the depth of the serrations and the maximum extent of movement of the knives is chosen such that the individual strips are pierced through at spaced portions from one side of the strip and are indented from the other side of the strip in areas between the pierced through perforations.

This invention also provides an apparatus for practicing the method. The apparatus includes a strip conveyor having a vertical reach which moves the strips vertically between opposed relatively moveable knife edges with at least one of the knife edges moveable towards and away from the other. The knife edges are positioned on either side of the path of travel of the strips and, in the preferred embodiment, are provided with serrated edges having spaced projections separated by recesses. The projections on the opposed knife edges are offset from one another whereby the projections of one knife edge are aligned with the recesses of the opposed knife edge.

The knife blades are mounted on pivotably moveable holders allowing the knife blades to arcuately move in the direction of travel of the strips. The holders are actuated to move the knife blades towards one another by actuator means such as pneumatic cylinders which are timed by timing means which in turn are related to the strip conveyor movement speed.

In a preferred embodiment the timer means is variable allowing the number of actuations of the knife blades per length of movement of the strips to be varied in a manner allowing variable spacing of the score or perforation lines lengthwise of the strips.

It is therefore an object of this invention to provide an improved method of separating pasta long goods after drying by perforating the pasta strips before drying.

It is another object of this invention to provide apparatus for perforating pasta strips by means of opposed relatively moveable serrated edged knives positioned on either side of a path of movement of the pasta strips from a strip forming machine to a drying area, movement of the knives being timed to movement of the strips and the knives being pivotable in a direction of movement of the strips.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 7 is a fragmentary enlarged view taken along the lines VII—VII of FIG. 6.

DESCRIPTION OF THE PREFERRED EMBODIMENT

Figure 1:
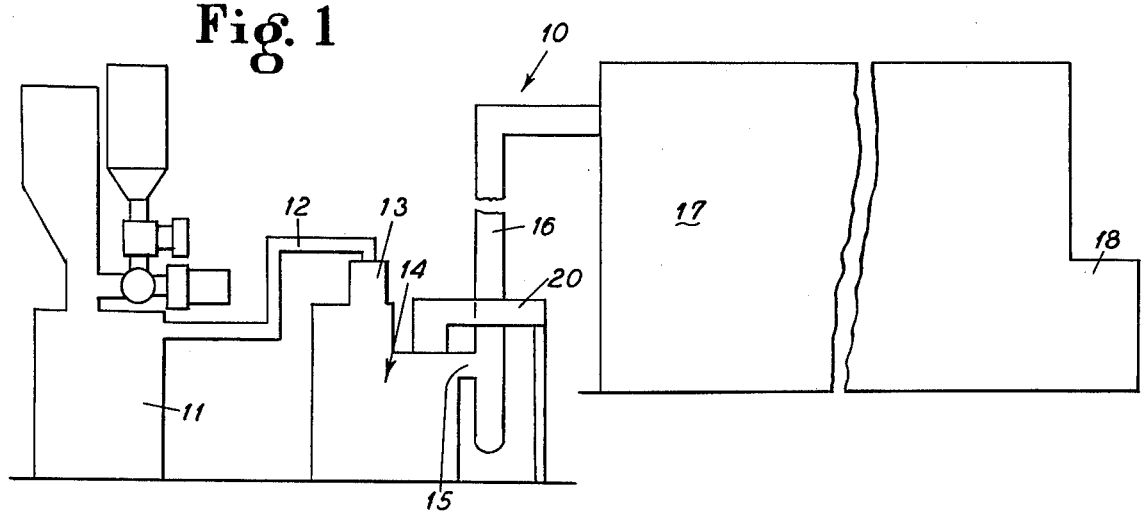
FIG. 1 is a diagrammatic block view of a pasta making device provided with a perforating device according to this invention.

FIG. 1 illustrates, in a schematic block diagram, a typical long goods pasta making sequence. The pasta is originated in a mixer and blender section 11 where a paste is formed. The paste is piped through conduit 12 under pressure to extrusion head 13 which extrudes a paste ribbon which is draped over drying sticks or rods in a trimming and draping section 14. The paste ribbon hangs from the sticks forming ribbon strips with the strips depending from the sticks in parallel. The strips are individually trimmed to length in the trimming portion of section 14.

Normally a plurality of extruding heads are provided in spaced relation such that a plurality of ribbons are draped over each stick along the length of the stick. The individual sticks are transported from the trimming section by a horizontal conveyor 15 to a vertical conveyor 16. The vertical conveyor then transports the sticks either directly to a drying device 17 or to a racking station where the sticks are racked for further transport to a drying room. After carefully controlled drying for a prolonged period, the dried strips are transported to a final cut and package station 18 where the individual strips are separated from the drying sticks and are broken to uniform lengths.

in the manufacture of a typical long goods pasta product such as, for example, lasagna, the extruded paste may be a mixture of approximately 70% by weight flour and 30% by weight water. The extruded paste ribbon may have a dimension of in excess of 5 feet and the individual strips may, for example, be trimmed at a distance from 24 to 36 inches from the stick top. After drying in a controlled drying chamber for a prolonged period to a final moisture content of approximately 9 to 11%, the individual draped strips, which may have encountered shrinkage of from 10 to 15%, are transported to a packaging area where the individual strips are broken away from the drying stick and are sawed to length. Due to the brittleness of the dried lasagna, up to a 70% waste figure has been encountered utilizing band saws. Final lasagna lengths may be, for example, 9 or 10 inches in length and approximately 2 inches in width.

According to the present invention, before entering the drying section 17, the pasta strips are passed through a perforator 20 or scoring device which acts upon the strips at longitudinally spaced areas to predispose the strips to break along a determined transverse line.

Figure 2:
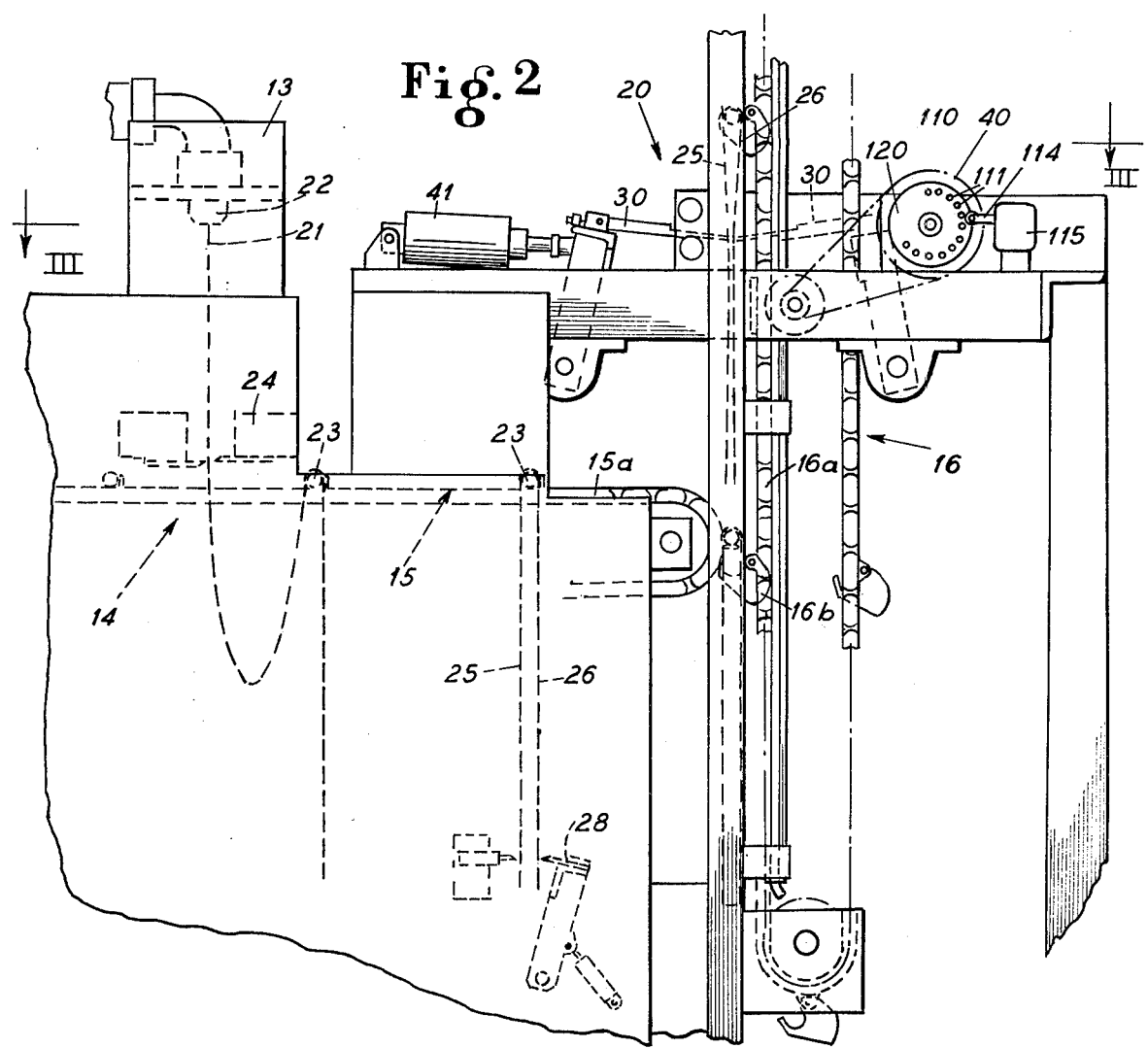
FIG. 2 is a side view of a pasta extruder and conveyor equipped with the perforator of this invention showing underlying portions by dotted lines.

As best illustrated in FIG. 2, this perforating or scoring of the pasta strips occurs shortly after extrusion and before the strips are entered into the drying chamber. As shown in FIG. 2, the paste ribbon 21 is extruded from an extruder head 22 which, in the case of lasagna, is an elongated slot having enlarged end regions. The pasta ribbon is draped over a drying stick 23 and is severed by a cutoff device 24. After cutoff the pasta ribbon hangs from the stick in two strips 25 and 26. The stick is moved along a horizontal conveyor 15a past a bottom trim device 28 which bottom trims the two strips so they are of equal length. Thereafter the horizonatal conveyor 15a transfers the sticks to a vertical conveyor 16 including parallel moving chains 16a and stick supports 16b. The vertical conveyor may, depending upon the design of the layout, move the sticks and depending strips upwardly or downwardly past the perforator device 20. The perforator includes opposed relatively moveable knives 30 which are moveable in a plane substantially normal to the path of movement of the conveyor 16. A timing device 40 times movement of the knives towards and away from one another in accordance with the movement of the conveyor 16. As the knives 30 are brought together, they entrap the depending strips 25 and 26 therebetween and score or perforate, or both, each individual strip. Surprisingly, it has been found that by controlling the number and extent of the perforations across the transverse width of the strip, that although the strip will be weakened in the area of contact by the knives, sufficient control can be achieved such that the strips will not separate into individual lengths along the score or perforation line even during subsequent handling and drying.

After scoring, the strips are dried, removed from the sticks and broken to length along the score and/or perforation lines.

Figure 3:
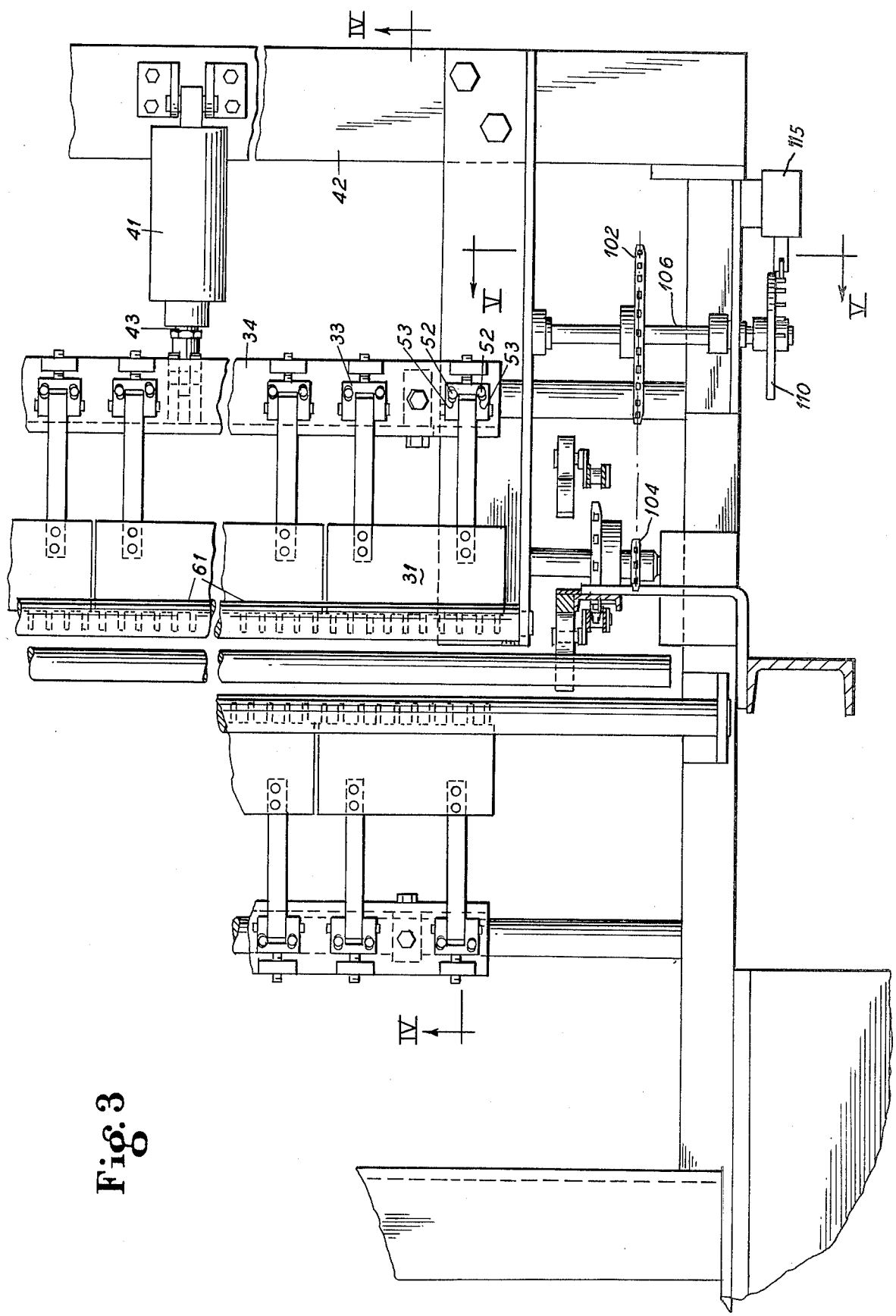
FIG. 3 is a fragmentary top view, partially in section, of the perforator section of the device of FIG. 2.

As best illustrated in FIG. 7, the knives 30 consist of blade portions 31 which are affixed to and project from the ends of spaced parallel knife holders 32. The holders in turn are pivotably attached to bracket member 33 carried on a support member 34. The support member extends substantially the length between the chains 16a. The support 34 is in turn mounted on pivot arms 35 carried on and keyed to transverse shafts 36. The shafts have end portions journaled in bearing blocks 37. A power cylinder such as pneumatic cylinder 41 has one end thereof pivotably mounted to a frame 42 of the perforator 20 and a power arm end 43 pivotably attached to the support 34 by means of bracket member 44. Positioning of the pivot brackets 33 on the support 34 is adjustable as by means of use of set screws 50 received in support carried wall members 51, the set screws being engageable with a back wall 33a of the bracket 33 and the bracket being affixed to the support 34 by means such as bolts 52 received in elongated slots 53 of the bracket 33 and threaded into threaded bores in the support 34. The bolts 52 and slots 53 are best illustrated in FIG. 3.

Figure 4:
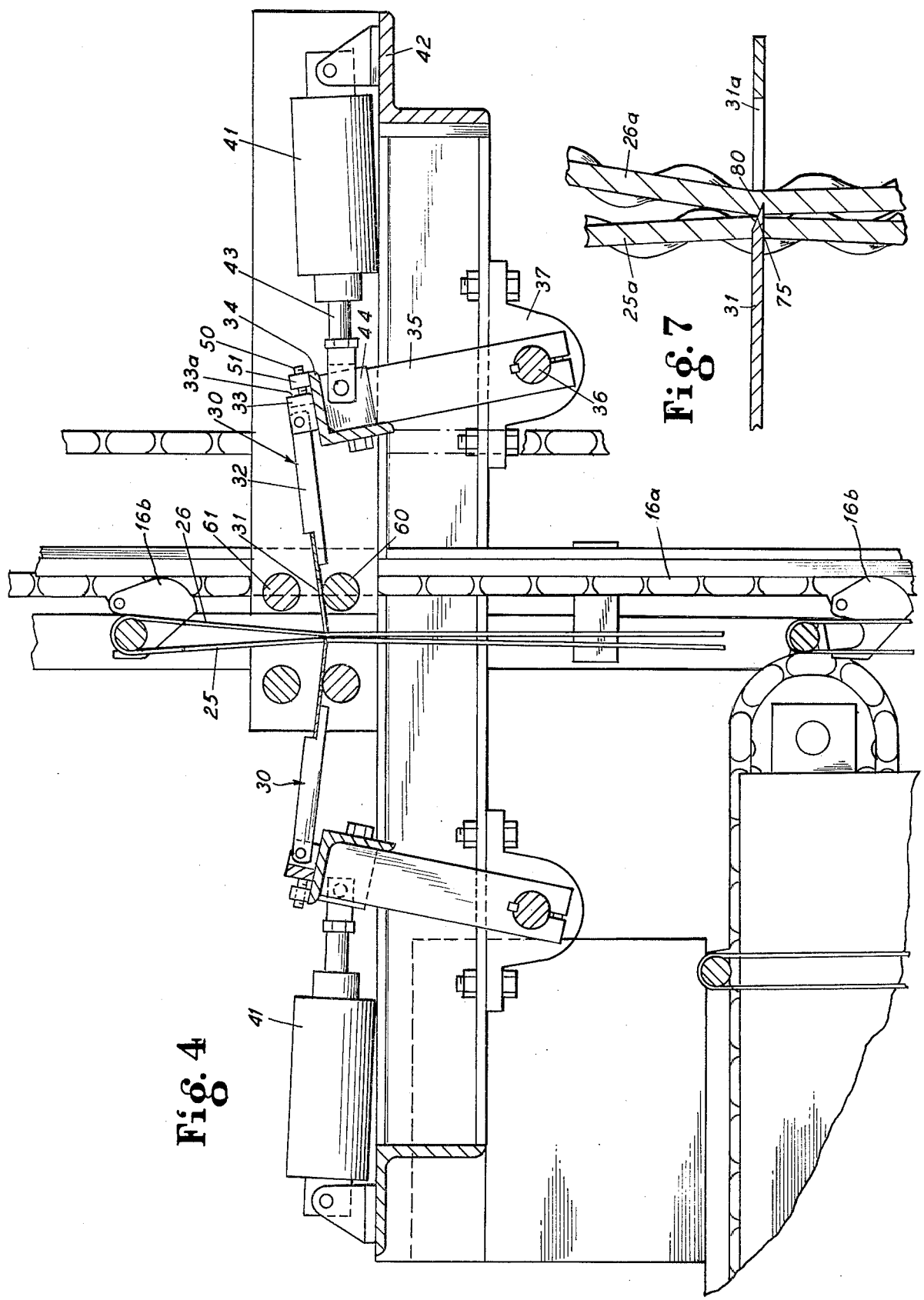
FIG. 4 is a side sectional view taken substantially along the lines IV—IV of FIG. 3.

The knife blades 31 project between the parallel limit rods 60 and 61 which extend substantially the length of the knives between the chains 16a. As best shown in FIG. 4, the knife 31 will, by operation of gravity, normally pivot around the pivotable connection with bracket 33 until the knife blade rests on the bottom rod 60. Thereafter activation of cylinder 41 will cause the knife 31 to move towards the opposed knife and to contact the pasta long goods strip 25 or 26. Since the vertical conveyor continues movement throughout this time, in order to avoid ripping of the strip while the knife 31 is engaging the strip, the pivot connection with bracket 33 allows the strip contacting edge of the knife to move upwardly with the upward movement of the strip. Upward movement of the knife will be terminated by engagement with the upper rod 61, however it is intended that in all instances cylinder 41 will be deactivated to withdraw the knife prior to contact with rod 61. However since the pasta strip is wet at the time of perforation, any tendency of the strip to stick to the knife thereby continuing to draw the knife upwardly will be countered by contact of the knife with the rod 61 thereby allowing the continued upward movement of the strip 26 to draw the strip off of the knife end thereby giving the knife blade sufficient time to fall to the bottom rod 60 before reactivation of the cylinder 41.

It will also be appreciated that the presence of the rod 61 insures that the knife will not be flipped upwardly upon sudden reverse movement under influence of cylinder 41.

Figure 6:
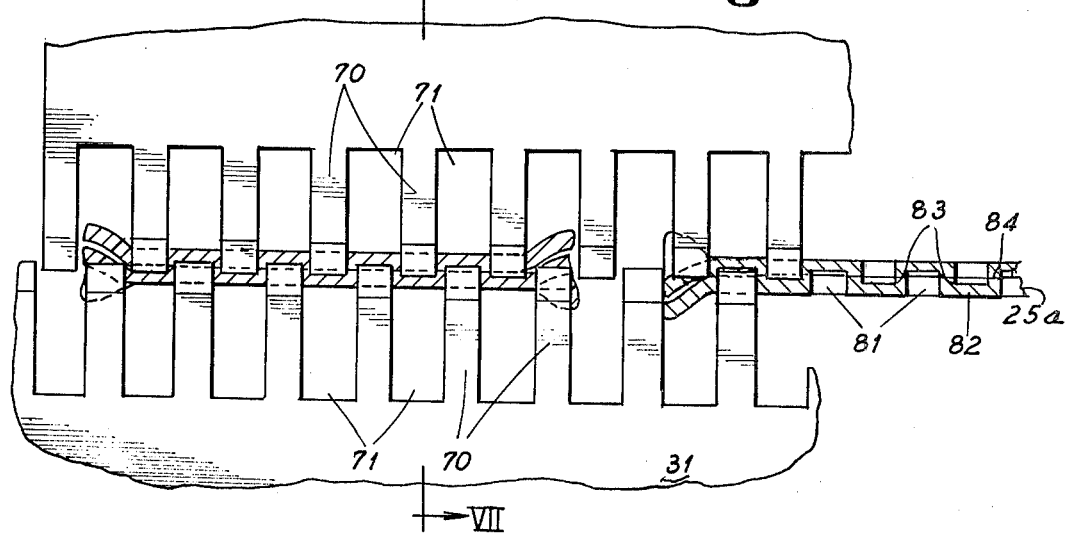
FIG. 6 is an enlarged fragmentary view of the opposed serrating knives of this invention with strips of pasta positioned therebetween.

As best shown in FIG. 6, each of the knife blades 31 are provided with serrated cutting edges. The serrated edges are formed with spaced apart projecting teeth 70 separated by recesses 71. The ends of the teeth 70 may be beveled as at 75 shown in FIG. 7 providing a sharp piercing edge. The width of the teeth 70 and grooves 71 is preferably chosen with respect to the type of long goods being processed so that the long goods is not unduly weakened by the piercing and scoring operation. It has, for example, been proposed to use knives having teeth of one eighth inch width separated by recesses of three eighths inch width in association with perforation of standard lasagna.

Positioning of the knives on the support 34 is preferably coordinated with the stroke of the power arm 43 of the cylinders 41, which is preferably adjustable, to provide a combined pierce-scoring treatment of the pasta strips. Thus, as shown in FIG. 7, the knife 31a first contacting one strip, for example, strip 25a, will entirely pierce that strip and will contact the parallel strip 26a producing an indentation or score 80. At the same time the opposed knife 31a will pierce the strip 26a while scoring the strip 25a. This is shown also in FIG. 6 where it can be seen that each strip will thus be alternately pierced from one side and scored from the other side. As shown the strip 25a has been pierced at 81 from the face 82 and has been scored at 83 from its opposite side 84. By staggering the teeth 70 and recesses 71 of the opposed knives, this alternate pierce and score is readily achieved.

Figure 5:
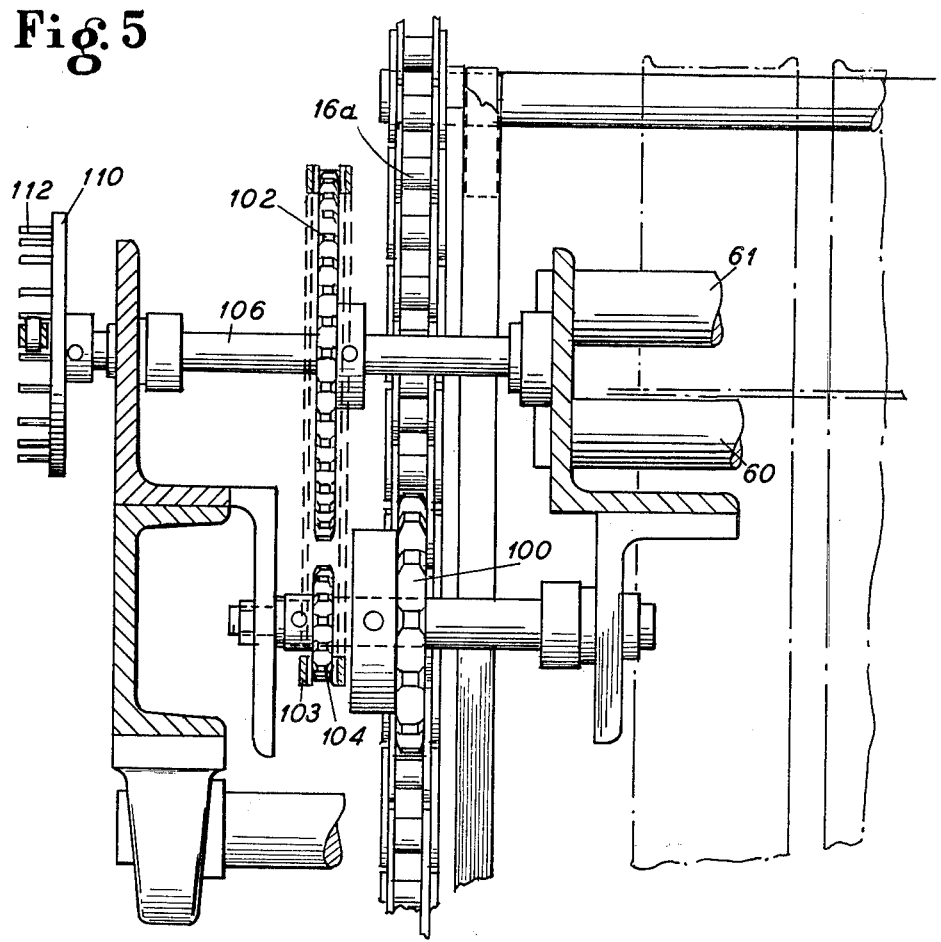
FIG. 5 is a fragmentary sectional view taken along the lines V—V of FIG 3.

Movement of the knife blades is preferably timed to movement of the vertical conveyor. As shown in FIG. 5, a sprocket 100 is engaged by vertical conveyor chain 16a and rotates in dependent relationship to the vertical movement of the conveyor chain. Sprocket 100 drives sprocket 102 through the intermediary of chain 103 and sprocket 104. Shaft 106 affixed to sprocket 102 in turn drives timing wheel 110. As shown in FIG. 2, timing wheel 110 has a plurality of openings 111 therein into which projecting pins 112 may be affixed. Pins are adapted to be engaged by actuator 114 of microswitch 115. Microswitch 115 operates valving (not shown) for controlling movement of the cylinders 41. Since the amount of rotation of timing wheel 110 will therefore be directly responsive to the movement of conveyor 16a and since the stick supports 16b of conveyor 16a are equally spaced along the length thereof, by providing a gap area 120 on timing wheel 110 where no pins 112 exist to trip the microswitch 115, it can be assured that the cylinders 41 will not be actuated at a time when a stick 23 is passing the perforating area. Moreover, by using removable pins 112, the spacing between score lines along the length of the strips 26 can be accurately controlled and varied.

It can therefore be seen from the above that this invention provides an improved method and apparatus for severing relatively wide pasta long goods to lengths of uniform dimension by perforating the pasta strips at longitudinally spaced areas while the strips are wet and thereafter drying the strips and breaking them along the perforation lines. Perforation is accomplished by entrapping the strips while they depend from drying sticks between two opposed relatively moveable serrated edged knives. In the preferred embodiment the strips are perforated while moving vertically hanging from sticks which are moved by a conveyor chain vertically between the opposed knives. Movement of the knives into contact with the strips is timed in accordance with movement of the conveyor and the extent of movement of the knives is such that the two strips hanging from each stick will each be perforated only by one of the knives. Preferably movement of the knives continues beyond the point of perforation of the one strip to indent or score a portion of the other strip without perforation.

Although the teachings of my invention have herein been discussed with reference to specific theories and embodiments, it is to be understood that these are by way of illustration only and that others may wish to utilize my invention in different designs or applications.

I claim as my invention:

1. The method of making elongated relatively wide pasta of substantially uniform lengths comprising the steps of mixing a pasta paste, extruding the paste through an elongated die opening forming a paste ribbon, draping the ribbon over a moveable drying stick, cutting the paste at the die whereby the ribbon drapes over the drying stick in a double strip depending from the drying stick, passing the double strip depending from the drying stick between opposed scoring members having opposed knife edges with spaced projections extending therefrom, moving the knife edges towards one another entrapping the strips therebetween, perforating each of the strips by the projections of at least one of the knives in spaced portions transverse the width of the strip forming a first line of perforation for each of the strips, withdrawing the knives, moving the strip a predetermined distance with respect to the knives, moving the knives towards one another entrapping the strips therebetween and perforating each of the strips by at least one of the knives in spaced portions transverse the width of the strip spaced from the first line of perforations longitudinally of the strip, moving the strips from between the knives to a drying area, drying the strips to form dried pasta, and breaking the strips along the lines of perforations.

2. The method of claim 1 wherein movement of the knives is controlled to have at least some of the projections of each knife perforate entirely through one of the strips, continuing movement of the knife after perforation until the projections encounter a second of the strips adjacent the strip perforated by the projections, scoring the second of the strips by the projections, terminating movement of the knives prior to perforation of the second of the strips by the projections and withdrawing the knives whereby each of the strips depending from a stick is both perforated and scored transverse its width.

3. The method of claim 2 including the step of alternating the perforations and scoring transverse the width of each strip.

4. The method of making pasta products which comprises the step of extruding a wet pasta paste into a ribbon, draping the ribbon over a drying stick, moving the stick and ribbon vertically between opposed movable serrated edge knives with the ribbon forming strips free hanging from the stick moving the knives relative to one another to entrap the ribbon depending from the stick therebetween, perforating the ribbon by projections of the serrated edge while the ribbon is moving past the knives, pivoting the knives to accommodate movement of the ribbon, withdrawing the knives, and thereafter drying the ribbon.

* * * * *